Figure 1:
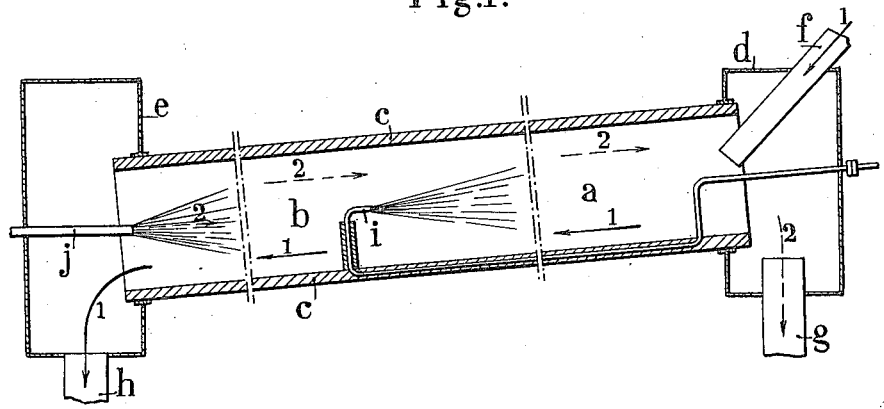

L. P. BASSET.
PROCESS FOR THE MANUFACTURE OF CEMENT, &c.
APPLICATION FILED MAR. 4, 1914.

1,244,280. Patented Oct. 23, 1917.

Fig.2ᵃ

WITNESSES
W. C. Baker Jr.
B. Joffe

INVENTOR
LUCIEN. PAUL BASSET
BY
ATTORNEYS

UNITED STATES PATENT OFFICE.

LUCIEN PAUL BASSET, OF PARIS, FRANCE.

PROCESS FOR THE MANUFACTURE OF CEMENT, &c.

1,244,280.  Specification of Letters Patent.  Patented Oct. 23, 1917.

Application filed March 4, 1914. Serial No. 822,289.

*To all whom it may concern:*

Be it known that I, LUCIEN PAUL BASSET, of 52 Rue Taitbout, in the city of Paris, Republic of France, have invented a Process for the Manufacture of Cement, &c., of which the following is a full, clear, and exact description.

The present invention relates to a process of manufacture of cement or hydraulic lime with the simultaneous production of sulfurous anhydrid or of sulfur, based on the decomposition of sulfate of calcium by charcoal or an equivalent reducer and clay.

To obtain a complete decomposition of the sulfate of calcium, it is necessary to add to the mixture of sulfate of calcium and clay, a certain quantity of charcoal or the like which transforms into sulfid of calcium a part of the sulfate, this sulfid then acting the part of reducer relatively to the remainder of the sulfate.

It is of importance that the sulfid of calcium, formed as above stated, be in just sufficient proportion.

If there is too much sulfid, some of it remains in the cement and removes all its value. If there is not sufficient of it, there remains in the cement non-decomposed sulfate which is injurious.

Further, it is impossible to obtain practically, by the action of charcoal or of other reducer, a mixture of sulfate and of sulfid of calcium which sufficiently approaches the theoretic proportion, so that the cement obtained contains neither sulfid or sulfate for the reductive power of carbon is not constant because said reductive power depends on the quality of the carbon and of the temperature at which it is caused to act.

The present invention has for its object a process enabling the complete decomposition of the sulfate of calcium to be obtained, at the same time avoiding any traces of sulfid remaining in the cement. This process is characterized, in principle, by the fact that the complete decomposition of the sulfate of calcium is obtained by means of an excess of sulfid of calcium, and this excess of sulfid is then reduced by oxidation. This oxidation is obtained by the oxygen of the air in excess in the furnace in which the operation is carried on.

This oxidation, in presence of clay, does not transform the sulfid into sulfate; it is formed from the lime and either from sulfur, or from sulfurous anhydrid, conformably to the following reactions:

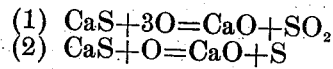

(1) $CaS + 3O = CaO + SO_2$
(2) $CaS + O = CaO + S$

In reality intermediary reactions may be produced. It is thus that the sulfurous acid, formed according to reaction (1) can react on the sulfid of calcium

$$2SO_2 + CaS = SO_4Ca + 2S$$

but this sulfate is again decomposed by the sulfid which is in excess

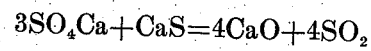

$$3SO_4Ca + CaS = 4CaO + 4SO_2$$

so that the reactions (1) and (2) well represent the final result.

The combination of the two fundamental reactions of the new process, that is to say, (a) the decomposition of the sulfate by an excess of sulfid, and (b) the decomposition of the sulfid in excess by an excess of air, permits of readily obtaining and in practical conditions, cement free from sulfate and from sulfid; in effect the first reaction is complete by means of the excess of sulfid and the second, being very exothermic, is readily realized.

The new process is further characterized by the manner in which the excess of sulfid is obtained which is necessary for producing the decomposition of the calcium sulfate. This excess of sulfid is obtained by adding an excess of charcoal or the like to the paste formed by the mixture of sulfate of calcium and clay.

In order then to destroy the excess of sulfid by means of oxygen, as above indicated, the furnace should, in the roasting zone, work in an oxidizing atmosphere.

The accompanying drawing shows as an example only, and in a diagrammatic way, the arrangement of the furnace.

Figure 2:
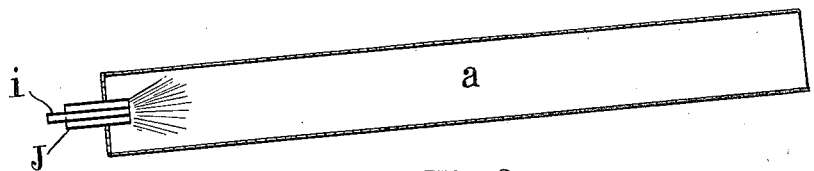

Figure 1 is a longitudinal section;

Figs. 2, 2ª, 3 and 4 show various positions that may be occupied by the twyers.

This furnace, shown in Fig. 1 of the drawing comprises two distinct parts $a$ and $b$. The part $a$ constitutes a reducing zone and the part $b$ an oxidizing zone.

This furnace consists of a rotating cylinder $c$ of great length, the ends of which enter two fixed chambers $d$ and $e$.

In the first chamber is arranged a chute $f$ conveying the paste, formed by the mixture of clay, sulfate of calcium and a little charcoal or the like and a discharging conductor $g$ opening into the chimney.

In the second chamber the discharge for the treated products is shown at $h$.

A twyer $i$ serves as an injector, either of oxid of carbon or other reducer, or of charcoal or the like, in powder carried along by a little air under pressure, or preferably, by a fraction of the gases of combustion taken from $d$, still hot and deprived of oxygen. This charcoal or the like burning in the flame, absorbs the oxygen from the air in excess and furnishes oxid of carbon.

On the other hand, air in excess is introduced by a twyer $j$.

The paste formed by the mixture, either dry or moist, of sulfate of calcium, clay and a little charcoal or the like, is introduced by the chute $f$ and falls into the end of the furnace, then it advances from the right end of the furnace toward its left end. In proportion as it advances it encounters higher and higher temperatures.

In all the zone $a$ to the right of the twyer $i$ the atmosphere is reducing; under the action of the oxid of carbon contained in the gases of the furnace and that of the charcoal or the like contained in the paste, a certain quantity of sulfate is transformed into sulfid and this sulfid is found in excess.

When the matters treated pass to the left of $i$ they encounter an oxidizing atmosphere which provokes the decomposition of the sulfid, according to the reactions (1) and (2). In the neighborhood of the twyer $j$ reigns the highest temperature. It is there where the roasting of the cement is effected.

The direction of travel of the products is indicated by the arrows 1; the gases travel in inverse direction as indicated by the arrows 2.

According to the quantity of charcoal or the like injected by the twyer $i$ the furnace gases have, in the part $a$, greater or less reducing power. This quantity of charcoal or the like can be readily modified, in course of working, and the composition of the furnace gases can be regulated at will.

This result is important, as the reducing power of the charcoal or the like varies according to the nature of the latter.

By delivering sufficient charcoal or the like at $i$ the charcoal or the like mixed with the paste may even be omitted.

Figure 3:
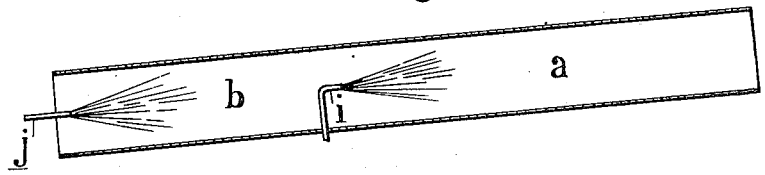
Figure 4:
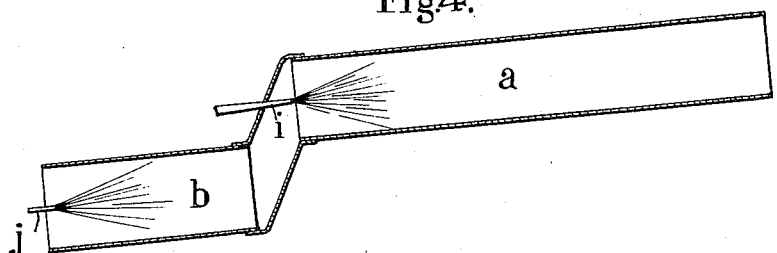
Figure 4:
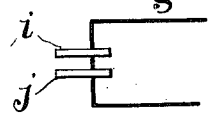

The position of the twyer $i$ may be varied and consequently the relative importance of the zones $a$ and $b$ may be modified. Figs. 2, 3 and 4 represent diagrammatically the possible positions of the twyers $i$ and $j$.

In the case of Fig. 2 the twyers $i$ and $j$ are concentrically shown. They might just as well be placed one next to the other as shown in Fig. 2ª. The furnace flame is reductive, as also all the atmosphere of the furnace after the twyer. The working of the furnace in this case is more delicate than in the other cases, the reducing power of the gases should be exactly regulated because the reductive atmosphere of the furnace must take from the mass of calcium sulfate a definite quantity of oxygen; if the gases are insufficiently reductive, there remains some sulfate, and if they are too reductive an excess of sulfid will be formed remaining in the cement.

The arrangement of Fig. 4 differs from that shown in Fig. 1 only in the shape of the furnace, which is composed of two distinctive parts at different levels connected by an inclined conduit, and at the entrance of which are respectively mounted the two twyers $i$, $j$. The reactions caused by the arrangement shown in Fig. 1 are also caused in a rigorous manner by the arrangement shown in Fig. 4.

With the new process and the new apparatus, there can be recovered as by-product, either sulfurous acid or sulfur.

In the case of sulfur, the dissociation is effected according to the following reactions

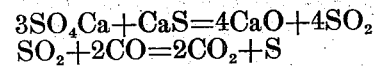

$$3SO_4Ca + CaS = 4CaO + 4SO_2$$
$$SO_2 + 2CO = 2CO_2 + S$$

The combination of these two reactions considerably facilitates the dissociation of the sulfate of calcium, as the sulfurous anhydrid liberated being broken up into sulfur as and in proportion as it is produced by the oxid of carbon or more generally by the reducer employed, inverse reaction is rendered impossible.

This combination of these two reactions takes place in the zone $a$ according to the reductivity of the atmosphere, the transformation of the sulfurous acid into sulfur is total or partial.

Applicant's furnace further enables the transformation of all the sulfurous acid into sulfur to be readily obtained, as the reducing power can be readily regulated.

If it is required to obtain sulfurous acid entirely free from sulfur and from carbonic oxid, air is introduced into the furnace, at a suitable place so as to completely oxidize the gases.

Generally speaking, the new process can be carried into effect in any furnace in which are provided two zones of different oxidizing power.

Thus the first zone, called dissociation zone, can be reducing and the second, called roasting zone, oxidizing, or the first zone can be neutral and the second rather highly oxidizing, or again the first slightly oxidizing and the second highly oxidizing.

According as the furnace happens to be in one of the three above cases, the proportion of charcoal is modified accordingly relatively to the total mass of the mixture, whether the charcoal be incorporated in the mass at the beginning of the operation or during the reaction, or else, reversely, considering a mixture to be treated of determined composition, the working of the furnace is controlled according to the composition of the mixture.

For instance if a small excess of charcoal or the like is added to the mass, it is advisable to have first a reducing atmosphere at the entrance of the furnace (which is then the dissociation zone) and moderately oxidizing in the second zone.

If, on the contrary, a large excess of charcoal or the like is added, it is advisable to have a furnace with an oxidizing atmosphere from end to end, slightly oxidizing at the entrance, in the dissociation zone, and highly oxidizing in the second zone. In this case, the mass being of a highly reducing nature, the oxidizing influence of the atmosphere, in the first zone, does not prevent the whole of the conditions of treatment to be at this moment reducing conditions.

As will be understood, it is necessary to consider at every moment the whole of the conditions resulting from the nature of the mass treated and from the nature of the furnace atmosphere and by suitably regulating either the one or the other, it is possible, on the one hand, to vary in sufficiently large proportions the quantity of charcoal or the like added to the mixture treated and, on the other hand, to utilize any furnace having two zones of different oxidizing power, as stated above.

By varying the composition of the mixture or the nature of the atmosphere of the furnace, as explained above, it is possible to go on up to limit cases. Thus by diminishing the quantity of charcoal or by increasing the reducing power of the furnace atmosphere, the extreme case would be reached where the charcoal would be completely done away with. The reaction set forth at the beginning of the present specification, that is to say the formation of an excess of sulfid, is still possible. However, it is to be understood that these limit cases are, usually, less advantageous than the normal case set forth at the beginning of the specification.

In the same way, it is possible to vary the proportion of charcoal, as just explained, even by continuing up to the limit case where the charcoal is done away with; it is also possible to vary the proportion of clay for obtaining cements of different quality; by continuing up to limit cases, it will be possible to manufacture quick lime or slag.

In the case where the clay is done away with and where quick lime is obtained, this lime can afterward be mixed, after slaking, with clay, for obtaining hydraulic lime, Portland cement, or slag, according to the proportions.

If, on the contrary, an excess of clay is used, the slag obtained (silico-aluminate of calcium) is mixed with lime or carbonate of lime in suitable proportions for obtaining, by a new roasting, Portland cement or hydraulic lime.

If the slag has been granulated, its simple mixture with slaked lime will give slag cement.

Claims:

1. A process of manufacturing cement or hydraulic lime by the decomposition of calcium sulfate in the presence of clay, with production of sulfurous acid, consisting in treating the calcium sulfate by an excess of calcium sulfid and in decomposing the latter by oxidation.

2. A process of manufacturing cement or hydraulic lime by the decomposition of calcium sulfate in the presence of clay, with production of sulfurous acid, consisting in reducing a part of the calcuim sulfate to be treated to calcium sulfid by means of an excess of carbon added to the mixture of plaster and clay,—in treating the remainder of the calcium sulfate by an excess of calcium sulfid, thus obtained, and in decomposing said sulfid by oxidation.

3. A process of manufacturing cement and liquid hydraulic lime by decomposition of plaster in the presence of clay, with production of sulfurous acid, consisting in—reducing in a furnace a part of the calcium sulfate to be treated to calcium sulfid by means of an excess of carbon added to the mixture of plaster and clay, this excess of carbon being proportional with the quantity of oxygen traveling in the furnace, in treating the remainder of the calcium sulfate by means of an excess of this sulfid, and in decomposing this sulfid by an oxidation.

4. A process for the manufacture of cement and hydraulic lime with production of sulfurous acid, consisting in adding an excess of carbon to a mixture of sulfate of calcium and clay, subjecting the mixture to heat in a furnace, the excess of carbon being proportional to the quantity of oxygen traveling through the furnace, reducing a portion of the sulfate of calcium by the excess of carbon to obtain an excess of sulfid of calcium, decomposing the remainder of the sulfate of calcium by means of the excess of sulfid of calcium, and subsequently subjecting the mixture to the action of atmospheric air in excess to decompose the sulfid by oxidation.

5. In a process for the manufacture of cement and hydraulic lime, subjecting a mixture of sulfate of calcium and clay to heat in the presence of a reducing agent thereby decomposing a portion of the sulfate and obtaining sulfid of calcium in excess, decomposing the remainder of the sulfate of calcium by means of the excess of sulfid of calcium, subsequently decomposing the sulfid of calcium by oxidation, and finally obtaining sulfurous acid as a by-product of the reduction.

6. A process of manufacturing cement or hydraulic lime by the decomposition of plaster in the presence of clay with the production of sulfurous acid consisting,—in reducing in a furnace a part of the calcium sulfate to be treated to calcium sulfid by means of an excess of carbon added to the plaster, this excess of carbon being proportional with the quantity of oxygen traveling through the furnace, in treating the calcium sulfate by an excess of calcium sulfid thus obtained,—in decomposing this sulfid by an oxidation, in causing the lime obtained to act immediately in the presence of the clay and in subjecting the mixture to a second roasting.

7. A process of manufacturing cement and hydraulic lime by the decomposition of plaster in the presence of clay, with production of sulfurous acid, consisting—in reducing in a furnace a part of the calcium sulfate to be treated to calcium sulfid by means of an excess of carbon added to the plaster, this excess of carbon being proportional with the quantity of oxygen traveling through the furnace,—in treating the remainder of the calcium sulfate by means of an excess of calcium sulfid thus obtained, in the presence of an excess of clay to completely decompose the calcium sulfate, in decomposing this sulfid by an oxidation, in causing the slag resulting from the decomposition of the plaster in the presence of an excess of clay to act immediately on the lime, and in subjecting the same to a second roasting.

8. A process for the manufacture of cement by the decomposition of the plaster in the presence of clay with the production of sulfurous acid consisting—in reducing in a furnace a part of the calcium sulfate to be treated to sulfid of calcium by means of an excess of carbon added to the plaster, this excess of carbon being proportional to the quantity of oxygen traveling through the furnace, in treating the remainder of the calcium sulfate by means of an excess of calcium sulfid thus obtained, in the presence of an excess of clay,—in decomposing this sulfid by oxidation, and in mixing immediately the slag resulting from the decomposition of the plaster in the presence of an excess of clay with slaked lime for obtaining a slag.

9. In a process for the manufacture of cement and hydraulic lime by means of sulfate of calcium and clay, reducing the sulfate of calcium by means of charcoal, putting the lime obtained into contact with the clay, and subjecting the same to heat to cause the lime to react with the clay.

10. A process for the manufacture of cement and hydraulic lime by means of sulfate of calcium and clay, which consists in treating a mixture of sulfate of calcium and clay to form sulfid of calcium, then decomposing the sulfid of calcium by oxidation to form oxid of calcium, and causing a reaction between the oxid of calcium and clay.

11. In a process for the manufacturing of cement and hydraulic lime by the decomposition of sulfate of calcium in presence of clay, which consists in subjecting the sulfate of calcium and clay to the action of heat, forming calcium sulfid out of the sulfate and then decomposing the sulfid by oxidation.

12. The herein described steps in a process for the manufacture of cement and hydraulic lime by the decomposition of sulfate of calcium in presence of clay, which consists in subjecting the sulfate of calcium and clay to the action of heat, converting the sulfate into a sulfid and then decomposing the so-formed sulfid to form calcium oxid.

13. The herein described steps in a process for the manufacture of cement and hydraulic lime by the decomposition of sulfate of calcium in the presence of clay, which consists in subjecting the sulfate of calcium and clay to the action of heat, converting the sulfate of calcium into a sulfid by means of calcium sulfid and then decomposing the so-formed sulfid to form calcium oxid.

The foregoing specification of my process and apparatus for the manufacture of cement or hydraulic lime, with the simultaneous production of sulfurous anhydrid or of sulfur, signed by me this 13th day of February, 1914.

LUCIEN PAUL BASSET.

Witnesses:
 HANSON C. COXE,
 RENÉ THIRIOT.